July 21, 1925.
J. J. LUCAS
HYDRAULIC BRAKING MEANS FOR MOTOR VEHICLES
Filed Dec. 26, 1924
1,547,054
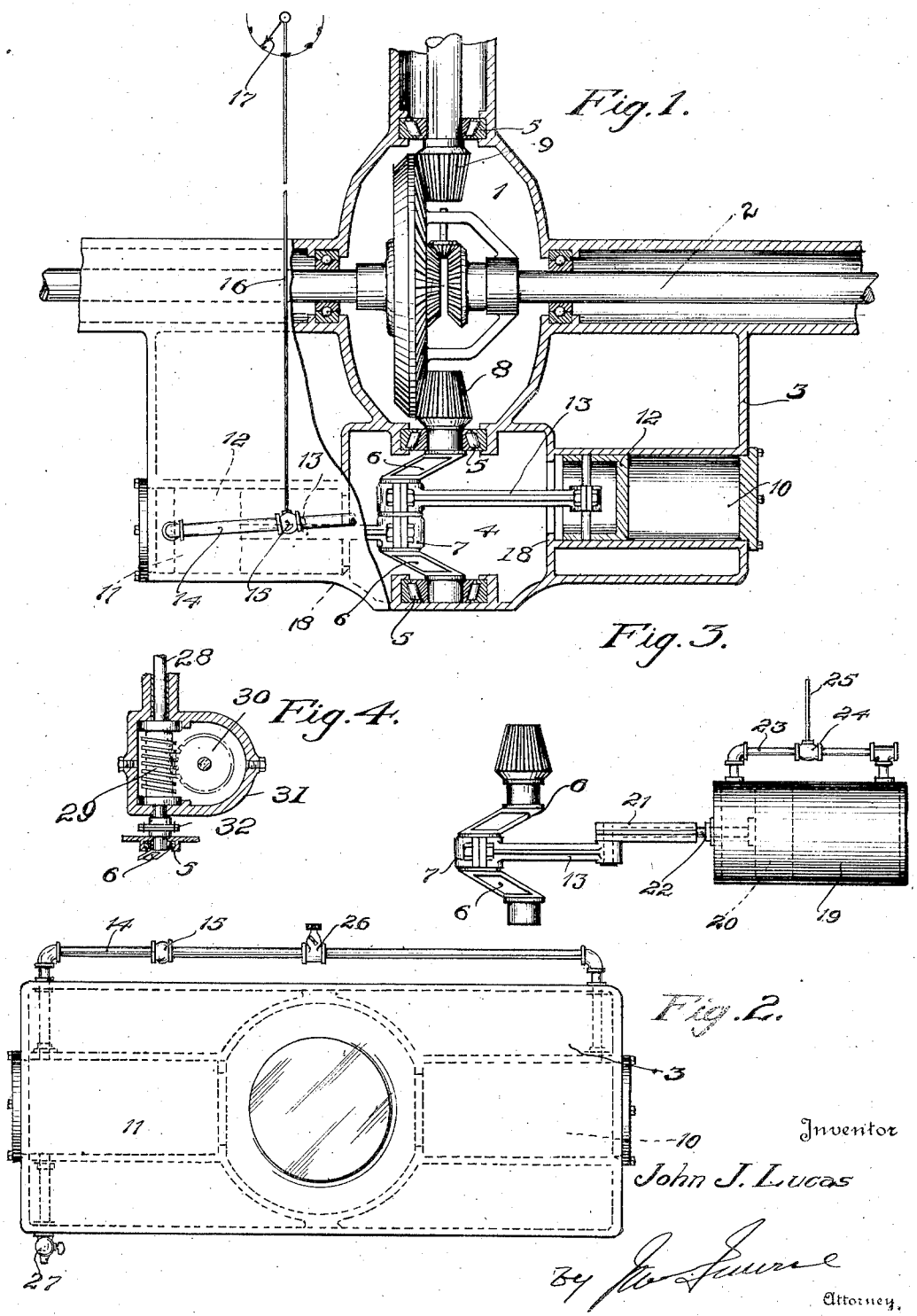
Inventor
John J. Lucas

Patented July 21, 1925.

1,547,054

UNITED STATES PATENT OFFICE.

JOHN J. LUCAS, OF LINCOLN, WASHINGTON.

HYDRAULIC BRAKING MEANS FOR MOTOR VEHICLES.

Application filed December 26, 1924. Serial No. 758,233.

*To all whom it may concern:*

Be it known that I, JOHN J. LUCAS, a citizen of the United States of America, residing at Lincoln, in the county of Lincoln and State of Washington, have invented certain new and useful Improvements in Hydraulic Braking Means for Motor Vehicles, of which the following is a specification.

This invention relates to an improvement in hydraulic braking means for motor vehicles, and is generally directed to means for circulating a fluid under normal movement of the vehicle, and for controlling this circulation to induce a braking action.

The invention generally stated is directed to providing opposing pistons, or a single piston with opposing action, the movements of the respective pistons or of the single piston inducing a circulation of fluid from one point to another, together with means for controlling this circulation at will, whereby to retard the movement of the pistons, or piston, such movement being directly governed from and in the movement of some part of the vehicle.

The invention is illustrated in the accompanying drawings, in which:

Fig. 1 is a plan view, partly in section, showing the improved braking means in its preferred form.

Fig. 2 is an end elevation of the same.

Fig. 3 is a view similar to Fig. 1 showing a slightly modified form of braking means.

Fig. 4 is a broken view of a modified application.

The improved braking means is preferably arranged adjacent to and correlated in action with the usual differential 1 of the vehicle, through which, as understood, the rear axles 2 are driven. For the purposes of the present invention, the rear axle housing is provided with a casing extension 3, which is preferably an independent casing and bolted or riveted in place, this casing 3 being arranged in rear of the differential housing and preferably connected to the respective axle housings on both sides of such differential housing.

Within the casing 3 is arranged what may be termed a crank case 4, disposed directly in rear of the differential housing and communicating with the latter. Bearings 5, suitably supported in the crank case 4, rotatably support a crank shaft 6, having a single crank 7. The operative end of the crank shaft extends into the differential housing and is provided with a pinion 8 to cooperate with the ring gear of the differential, preferably diametrically opposite the usual drive pinion 9. Supported in the case 3 and arranged in open communication with the crank case 4, are opposed cylinders 10 and 11. These cylinders are adapted to receive pistons 12 connected by connecting rods 13 with the crank 7 of the crank shaft 6. It is noted that in the preferred form, the cylinders 10 and 11 are arranged on opposite sides of the crank shaft and are relatively offset so that the connecting rods 13 may be connected side by side on the crank 7 of the crank shaft.

Cylinders 10 and 11 beyond the outward limit of movements of the respective pistons are in inter-communication through a bypass 14 in the form of a pipe connecting these respective cylinders. A valve 15 is provided in this pipe and a control rod 16 for such valve extends lengthwise the chassis to a position convenient to the driver of the vehicle, whereby through the coupled relation of a suitable indicator 17, the operator may, at will, set the valve to fully open, fully closed, or any one of a series of indicated intermediate positions, to thereby control the circulation of fluid through the bypass.

It will be noted that the pistons 12 are of the hollow type with their open sides toward the crank case 4, and that the inner open ends of the cylinders have marginal flanges 18 to prevent the pistons from being forced into the crank case in the event of breakage of the connecting rod.

In Fig. 3, I have shown a slightly modified form of the invention, wherein a single cylinder 19 is provided and a piston 20 arranged therein, with a stroke short of the respective ends of the cylinder. The connecting rod 13 in this instance is connected to a cross head 21 operating in guides, with said cross head connected to a rod 22, which in turn is connected to the piston 20. The respective ends of the cylinder 19 beyond the limit of stroke of the piston, are connected by a bypass pipe 23, having a control valve 24 governed from the dash as in the preferred form through a rod 25.

The system, in both the preferred and modified forms, is filled with fluid, preferably oil, the bypass having appropriately arranged T's 26 to permit such filling and the cylinders having drain petcocks 27 to permit drainage of the system at will.

Obviously, under normal movement of the vehicle with the valve in the bypass fully open, and the parts otherwise properly proportioned, the movement of the vehicle will operate the respective pistons 12 in the preferred form and the single piston 20 in the modified form to thereby compel a circulation of fluid from one cylinder to the other in the preferred form and from one end of the cylinder to the other in the modified form. As long as the valve is fully open, this circulation of the fluid is without retarding effect on the movements of the pistons or piston, and hence the operation is normal. A braking action being desired, the valve 15 of the preferred form or 24 of the modified form is controlled to the extent desired, thereby retarding the normal circulation and correspondingly retarding the movements of the pistons of the preferred form or the piston of the modified form. Thus a braking action to the desired extent may be readily provided for, it being obvious that this braking action is effective directly on the rear wheels of the vehicle and thus is fully operative notwithstanding the braking, for example, of the usual drive shaft.

The invention is equally applicable to worm gear drives as to ring and pinion gear drives, and in Fig. 4, I have shown such a drive, wherein the drive shaft 28 having the worm 29 to drive the worm gear 30 for the axles is extended beyond the casing 31 and provided with an appropriate coupling 32. The construction is otherwise the same as illustrated in Fig. 1, the crank shaft 6 instead of being provided with a pinion 8 as in the preferred form, is provided with a cooperating coupling member forming part of the coupling 32.

Claims:

1. A hydraulic brake for vehicles, including a casing secured to the rear axle housing and having a crank case portion in open communication with the differential housing, a crank shaft mounted in said crank case and operated by the main gear of the differential, means operated by said crank shaft to compel a circulation of fluid through a bypass, and manually operative means for controlling said fluid circulation to thereby induce a braking action on the movement of the crank shaft.

2. A hydraulic braking means for motor vehicles, including a casing connected to the rear axle housing and having a crank case portion in open communication with the differential housing, a crank shaft rotatably mounted in said crank case portion, a pinion on said crank shaft in gear with the differential, a piston operated by said crank shaft to compel circulation of a fluid, and means arranged for manual control to govern said circulation to retard the movement of the piston and thereby exert a braking action on the crank shaft.

3. A hydraulic braking means for motor vehicles, including a casing connected to the rear axle housing and having a crank case portion in open communication with the differential housing, a crank shaft rotatably mounted in said crank case portion, a pinion on said crank shaft in gear with the differential, opposed cylinders carried in the casing and open to the crank shaft portion, pistons in said cylinders connected to the crank shaft, and a valved bypass establishing communication between said cylinders beyond the operative stroke of the pistons therein.

4. A hydraulic braking means for motor vehicles, including a casing connected to the rear axle housing and having a crank case portion in open communication with the differential housing, a crank shaft rotatably mounted in said crank case portion, a pinion on said crank shaft in gear with the differential, opposed cylinders carried in the casing and open to the crank shaft portion, pistons in said cylinders connected to the crank shaft, and a valved bypass establishing communication between said cylinders beyond the operative stroke of the pistons therein, said cylinders being offset to permit straight line connection between the crank shaft and pistons.

In testimony whereof I affix my signature.

JOHN J. LUCAS. [L. S.]